May 14, 1929.                O. F. BAILEY                1,712,684
                      ATTACHMENT FOR TRACTORS
                       Filed Jan. 29, 1927          2 Sheets-Sheet 2
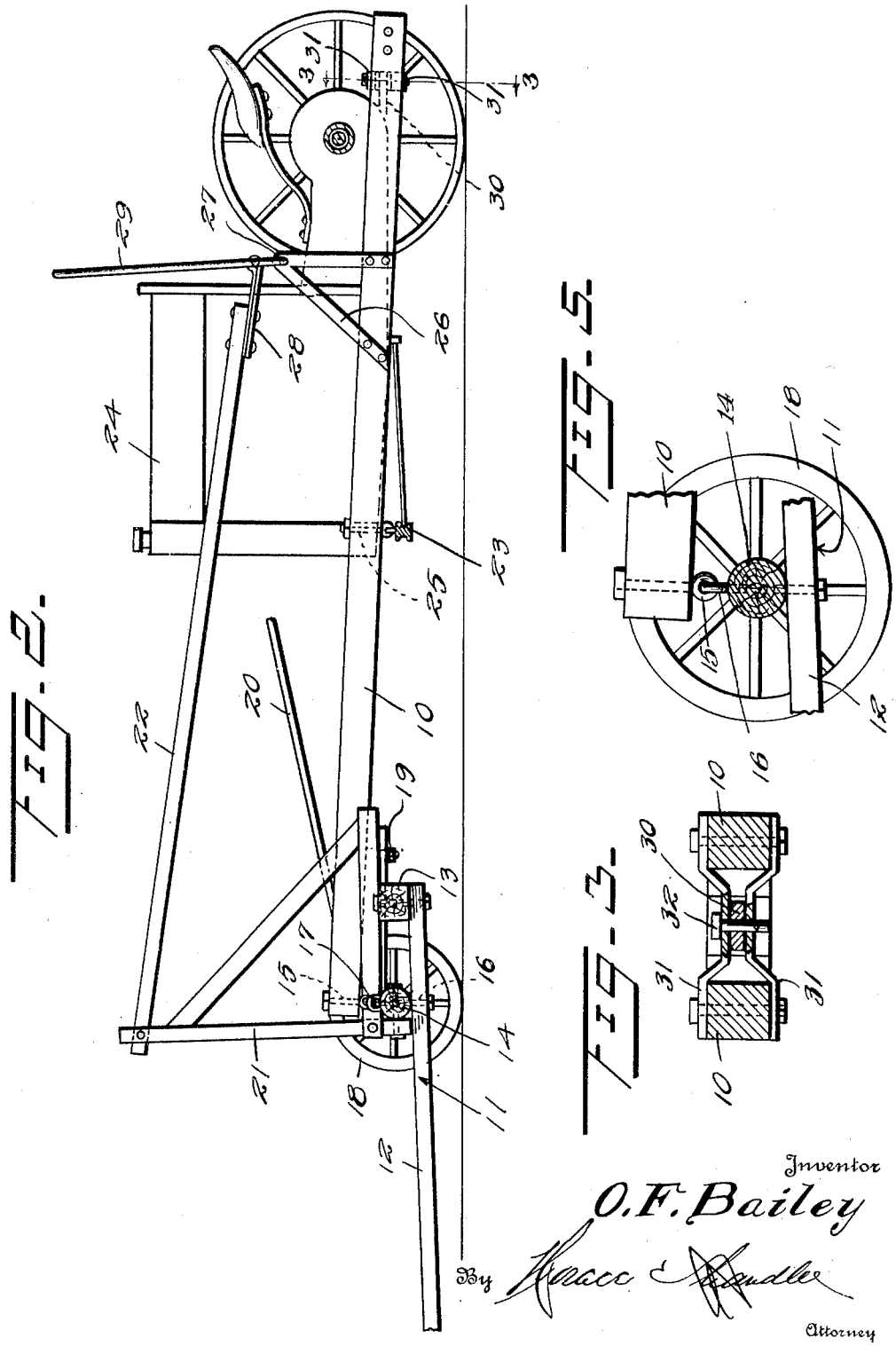
Inventor
O. F. Bailey
By
   Attorney Patented May 14, 1929.

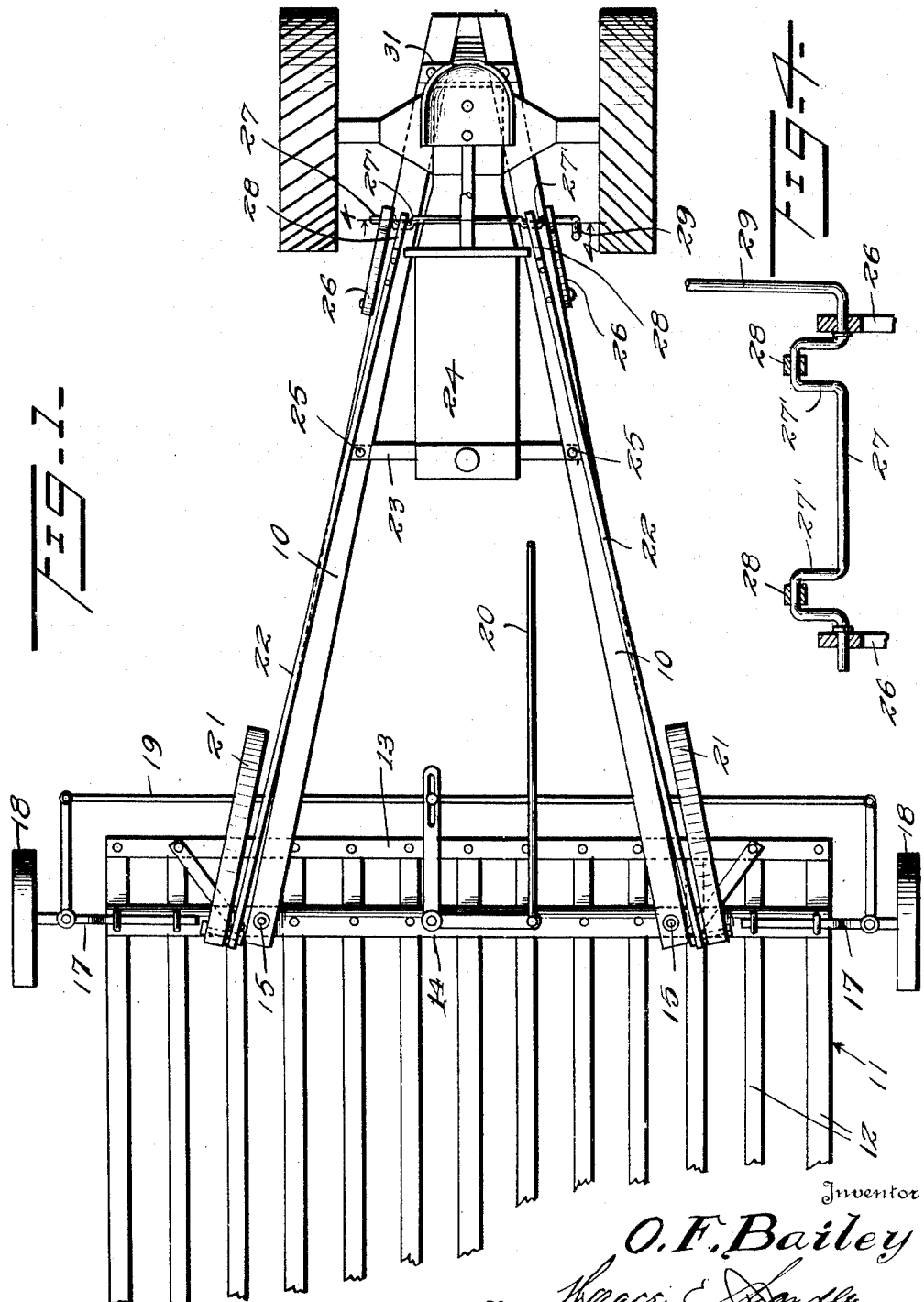

1,712,684

UNITED STATES PATENT OFFICE.

OLIN F. BAILEY, OF AGUANGA, CALIFORNIA.

ATTACHMENT FOR TRACTORS.

Application filed January 29, 1927. Serial No. 164,617.

This invention relates to new and useful improvements in tractors, and particularly to attachments therefor.

One object of the invention is to provide a buck rake which is readily adapted for attachment to a tractor.

Another object of the invention is to provide a device of this character wherein the guiding of the buck rake, and the tractor, are readily accomplished from the seat of the tractor.

Another object resides in the novel construction of the parts of the rake, whereby the same is readily attachable to the ordinary tractor, without modifications thereto.

Other objects and advantages will be apparent from the following description when taken in connection with the accompanying drawings.

In the drawings:

Figure 1 is a top plan view of the device.

Figure 2 is a side elevation of the same, one of the front wheels being removed.

Figure 3 is a vertical transverse sectional view on the line 3—3 of Figure 2.

Figure 4 is a vertical transverse sectional view on the line 4—4 of Figure 1.

Figure 5 is an enlarged fragmentary elevation of a portion of the rake.

Referring particularly to the accompanying drawings, 10 represents a pair of diverging beams, arranged in a horizontal plane, and properly bolted together at their converged ends. Disposed beneath the diverged ends of the beams is a rake, denoted as a whole by the numeral 11, and including the tines 12, connected together, at their rear ends, by the transverse bars 13 and 14. Secured to the forward ends of the bars or beams 10, and depending therefrom, are the eye-bolts 15, with which are engaged the eye-bolts 16, carried by the transverse bar 14, of the rake, and whereby said rake is suspended on the said beams. Mounted on the opposite ends of the bar 14 are the stub axles 17, and properly mounted on said axles are the steering wheels 18, the steering knuckles of which are connected by the tie rod 19, and such tie rod is properly connected to a rearwardly extending drag link 20. Secured to the end portions of the bars 13 and 14, are the vertical triangular frames 21, and connected to the upper end of each of said frames is a rearwardly extending link 22.

Suspended below the beams 10, intermediate their lengths, and transversely thereof, is a beam 23, which is the front axle of the tractor 24, the wheels of which have been removed and applied to the stub axles 17, as explained above. The said axle 23 is suspended by means of the eye-bolts 25, carried by the beams 10, whereby the front end portion of the tractor is properly supported on the beams. Erected on each of the beams 10, in rear of the axle 23, is a vertical bearing bracket 26, and supported at its ends in said brackets, is a crank shaft 27. The shaft 27 is provided with two crank portions 27', and pivotally connected to each of said crank portions of the shaft is a metal strip 28, said strip having its other end properly bolted to the adjacent end of one of the links 22. A lever 29 is secured to the shaft 27, for rocking the latter, whereby to move the links longitudinally of the machine, and accomplish the upward and downward tilting of the rake.

The rear end of the tractor is provided with the usual apertured draft lug 30, and disposed transversely of the converged ends of the beams 10, are the plates 31, one of said plates being arranged above the lug, while the other is arranged below the lug, a vertical pivot pin 32 being disposed through the plates and draft lug, whereby the rear end of the tractor is properly connected with the said beams, for moving the rake forwardly.

What is claimed is:

A sweep-rake for attachment to a tractor comprising a triangular frame the apex of which is secured to the rear of a tractor while the intermediate portions of the arms of which support the front of the tractor from which the front wheels have been removed, the base member of the triangular frame being extended beyond the sides of the arms and having steering knuckles attached thereto, a rake loosely suspended on the said base member and arranged therebeneath, ground wheels carried by the steering knuckles, a crank shaft supported transversely on the rear of the frame, rockers loosely connected with the base of the triangular frame and rigidly connected with the rake, and operative connections between the rockers and the crank shaft.

In testimony whereof, I affix my signature.

OLIN F. BAILEY.